United States Patent
Imazu

(10) Patent No.: US 7,110,867 B2
(45) Date of Patent: Sep. 19, 2006

(54) VIBRATION SUPPRESSION APPARATUS AND METHOD FOR HYBRID VEHICLE

(75) Inventor: Tomoya Imazu, Kanagawa (JP)

(73) Assignees: Nissan Motor Co., Ltd., Yokohama (JP); Renault s.a.s. societe par actions simplifiee, Boulogne-Billancourt (FR)

( * ) Notice: Subject to any disclaimer, the term of this patent is extended or adjusted under 35 U.S.C. 154(b) by 172 days.

(21) Appl. No.: 10/645,910

(22) Filed: Aug. 22, 2003

(65) Prior Publication Data

US 2005/0247503 A1 Nov. 10, 2005

(30) Foreign Application Priority Data

Aug. 26, 2002 (JP) ............................. 2002-245722

(51) Int. Cl.
*B60L 9/00* (2006.01)

(52) U.S. Cl. ............................. 701/22; 701/54; 475/5; 180/65.1; 180/65.3

(58) Field of Classification Search ................. 701/22, 701/51–54; 475/3, 5, 10, 35; 180/65.1, 180/65.2, 65.3, 65.4, 65.5, 65.6; 290/40 C; 318/432–433, 632; 123/179.1
See application file for complete search history.

(56) References Cited

U.S. PATENT DOCUMENTS

| | | | |
|---|---|---|---|
| 6,087,734 A | 7/2000 | Maeda et al. ............. 290/40 C |
| 6,244,368 B1* | 6/2001 | Ando et al. ................ 180/65.2 |
| 6,300,735 B1* | 10/2001 | Stemler ...................... 318/433 |
| 6,382,341 B1 | 5/2002 | Hashimoto et al. ......... 180/312 |
| 6,441,506 B1* | 8/2002 | Nakashima ................ 290/40 C |
| 6,592,484 B1* | 7/2003 | Tsai et al. .................... 475/5 |
| 6,806,667 B1* | 10/2004 | Sasaki et al. ................ 318/432 |
| 6,840,341 B1* | 1/2005 | Fujikawa ................... 180/65.2 |
| 6,887,175 B1* | 5/2005 | Yamauchi et al. ............ 475/10 |
| 2002/0190683 A1* | 12/2002 | Karikomi et al. ........... 318/632 |
| 2003/0069104 A1* | 4/2003 | Nakano et al. ............... 475/5 |
| 2003/0173934 A1* | 9/2003 | Arimitsu ...................... 322/34 |
| 2003/0224892 A1* | 12/2003 | Yamauchi et al. ............. 475/5 |
| 2004/0012206 A1* | 1/2004 | Wakashiro et al. ........ 290/40 C |
| 2004/0112654 A1* | 6/2004 | Kozarekar et al. ......... 180/65.2 |

FOREIGN PATENT DOCUMENTS

| | | |
|---|---|---|
| EP | 1 145 896 A1 | 10/2001 |
| JP | 2000-217209 A | 8/2000 |
| JP | 2001-315550 A | 11/2001 |

OTHER PUBLICATIONS

U.S. Appl. No. 10/455,846, filed May 28, 2003, Yamauchi et al.
U.S. Appl. No. 10/455,907, filed May 28, 2003, Yamauchi et al.

* cited by examiner

*Primary Examiner*—Gertrude A. Jeanglaude
(74) *Attorney, Agent, or Firm*—Foley & Lardner LLP

(57) ABSTRACT

In vibration suppression apparatus and method for a hybrid vehicle, the hybrid vehicle comprises at least one main power source, a plurality of auxiliary power sources, and a planetary gear mechanism to modify a gear ratio when an output of the main power source is transmitted to a drive output member and two power sources whose torque controls are enabled to be performed are selected and a vibration suppression control signal is superposed onto each of torque commands supplied to the selected two power sources to suppress two-degrees-of-freedom vibrations of the planetary gear mechanism.

20 Claims, 11 Drawing Sheets

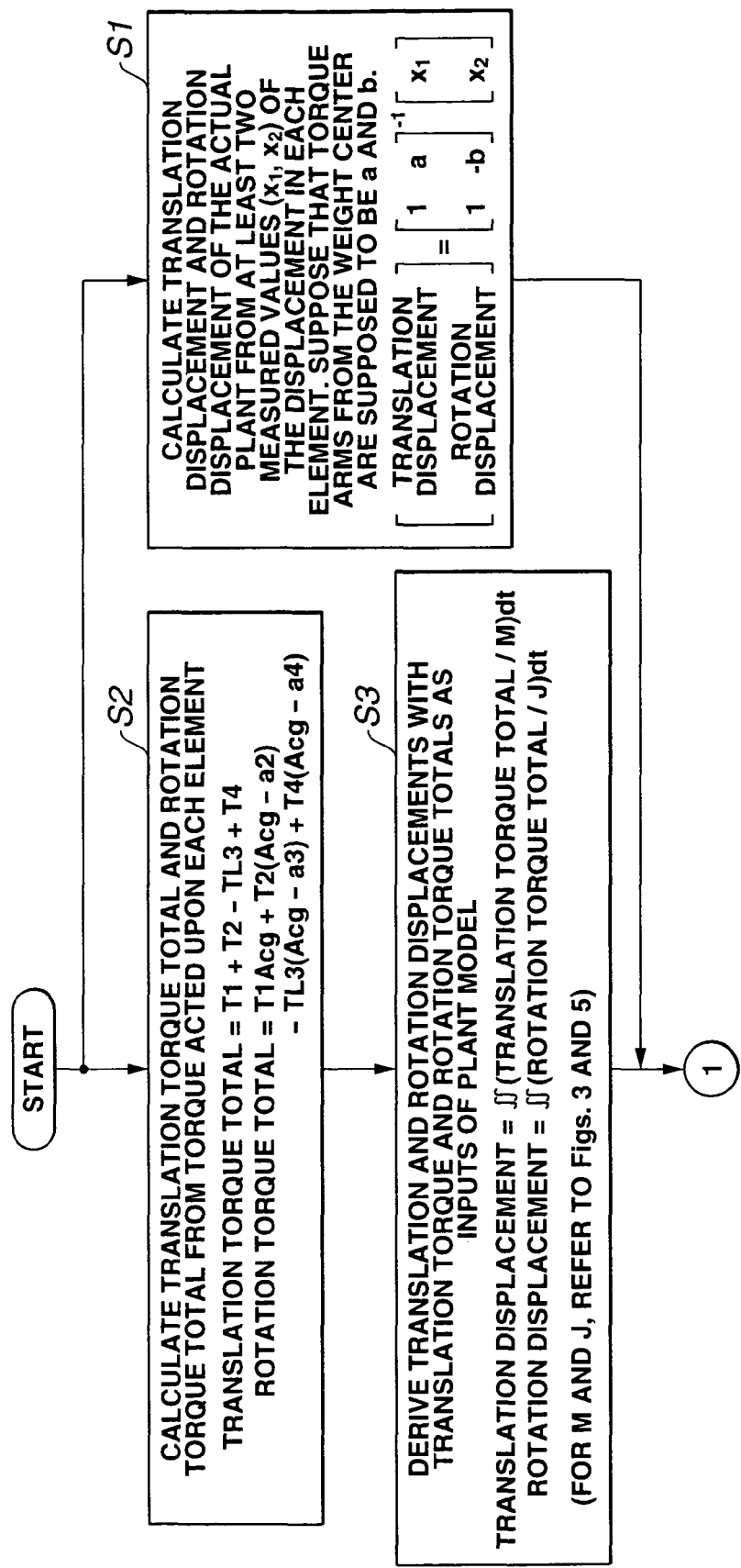

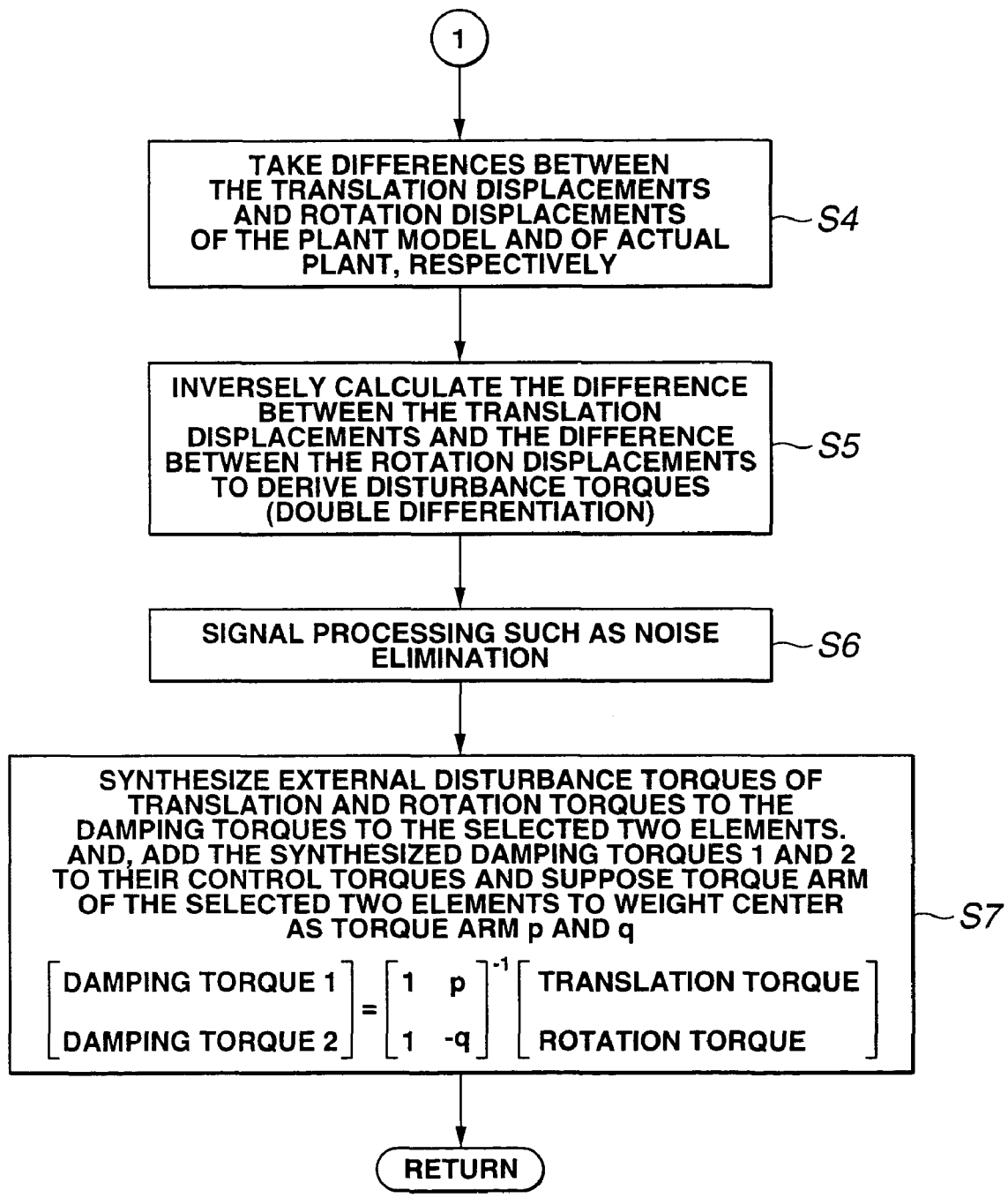

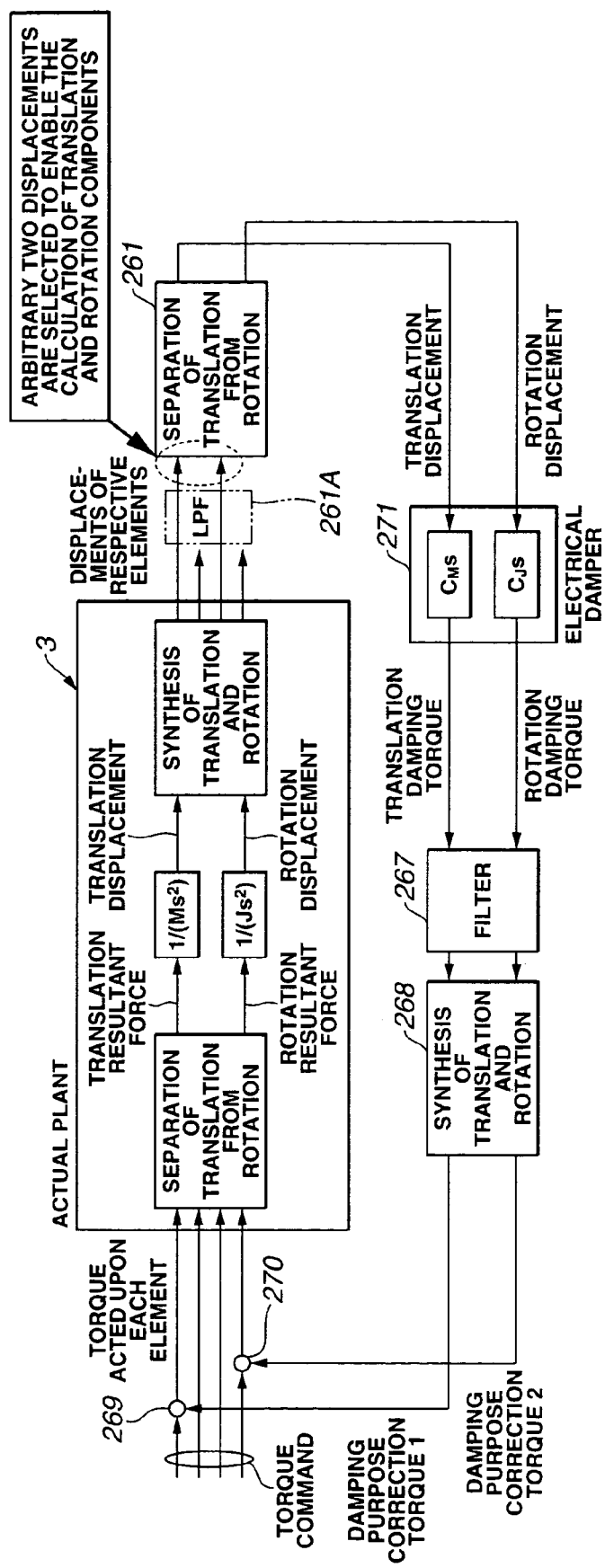

FOUR-ELEMENT PLANETARY GEAR MECHANISM

VIBRATION SUPPRESSION APPARATUS AND METHOD FOR HYBRID VEHICLE

BACKGROUND OF THE INVENTION

1. Field of the Invention

The present invention relates to apparatus and method for suppressing vibrations for a hybrid vehicle having, for example, an engine and two motors as drive sources.

2. Description of the Related Art

A Japanese Patent Application First Publication No. 2000-217209 published on Aug. 4, 2000 exemplifies a previously proposed vibration suppression apparatus for a vehicle having a motor as the drive source. In the previously proposed vibration suppression apparatus disclosed in the above-described Japanese Patent Application First Publication, an output error between an actual plant and a plant model is inversely calculated (since torque→rotation angle is double integrals, the inverse calculation is double differentiations) and this, the result of inverse calculation, is conditioned (extraction only from a signal having a predetermined frequency band) due to the output error being caused by only an external disturbance and is additively supplies as a correction torque command. In this construction, each of the actual plant and its model is treated as one-degree-of-freedom motion (second order as a state equation).

SUMMARY OF THE INVENTION

However, in the previously proposed vibration suppressing apparatus disclosed in the above-described Japanese Patent Application First Publication, the vibration of the actual plant is suppressed as the one-degree-of-freedom motion. Hence, in a case where the number of drive sources are many and motion degrees of freedom of vibrations of the whole power transmission mechanism in such as the hybrid vehicle is two or more, the vibration suppression is not effective, even if the technique of vibration suppression having one degree of freedom is applied.

It is herein noted that the meaning of "not effective" is, for example, in a case where a vibration on an output axle torque is tried to be reduced, a residual rotation vibration within an inside of the planetary gear mechanism is left therein so that wears of elements within the planetary gear mechanism are promoted. In addition, if the vibrations within the planetary gear mechanism are tried to be reduced as low as possible, the residual vibrations on an output axle torque are left thereon so that a vehicular comfortablity is not only lost but also the wear of a power transmission element which is located at the downstream position with respect to a final differential gear is promoted.

A problem occurs in a durability of components of the planetary gear mechanism. To prevent the durability problem from occurring, a strength (intensity) of the components thereof cannot help being augmented. Thus, this would result in an expensive manufacturing cost. Furthermore, the drive output torque is vibrated so that an unpleasant feeling is given to a vehicle driver and an unpleasant noise along with a minute vibration from the components is developed.

It is, therefore, an object of the present invention to provide vibration suppression apparatus and method for a hybrid vehicle which are capable of effectively suppressing the vibrations of a second-degrees-of-freedom in the planetary gear mechanism, thereby the strength of the planetary gear mechanism being decreased without sacrifice of a durability in components of planetary gear mechanism and the manufacturing cost being reduced, and which are capable of reducing unpleasant vibrations and noises of a drive output torque.

According to a first aspect of the present invention, there is provided a vibration suppression apparatus for a hybrid vehicle, comprising: a main power source; a plurality of auxiliary power sources; a planetary gear mechanism to modify a gear ratio when an output of the main power source is transmitted to a drive output member; and a vibration suppression control section that selects two power sources whose torque controls are enabled to be performed and superposes a vibration suppression control signal onto each of torque commands supplied to the selected two power sources to suppress two-degrees-of-freedom vibrations of the planetary gear mechanism.

According to a second aspect of the present invention, there is provided A vibration suppression method for a hybrid vehicle, the hybrid vehicle comprising: a main power source; a plurality of auxiliary power sources; and a planetary gear mechanism to modify a gear ratio when an output of the main power source is transmitted to a drive output member, the vibration suppression method comprising: selecting two power sources whose torque controls are enabled to be performed; and superposing a vibration suppression control signal onto each of torque commands supplied to the selected two power sources to suppress two-degrees-of-freedom vibrations of the planetary gear mechanism.

It is noted that the main power source corresponds to, for example, the engine or main motor. It is noted that the plurality of auxiliary power sources correspond to, for example, two or more independent motors, and a single motor having a common stator and two rotors, in an appearance, but functionally having two motor functions. It is noted that the planetary gear mechanism corresponds to Ravigneaux (or spelled Ravigneauwx) (type) compound planetary gear train constituted by a planetary gear train having at least four elements and two degrees of freedom, for example, to couple the four elements of the engine, the first motor, the second motor, and the drive output member. It is also noted that "superposing a vibration suppression control signal (damping purpose correction torque) onto each of torque commands supplied to two power sources correspond to additively supplying the damping purpose (vibration suppression control) signal to each of the torque commands supplied to the two power sources. A steady-state component of each of the torque commands is determined from a torque balance of the planetary gear mechanism. The torque balance of the planetary gear mechanism is determined from the speed of each element of the planetary gear mechanism and the speed of each element is determined from other constraint conditions such as power performance optimization and fuel consumption optimization.

This summary of the invention does not necessarily describe all necessary features so that the invention may also be a sub-combination of these described features.

BRIEF DESCRIPTION OF THE DRAWINGS

FIGS. 6A and 6B are an integrally flowchart representing a flow of the vibration suppression control operation executed in the vibration suppression controller in the first embodiment.

FIG. 7 is a control block diagram representing the vibration suppression controller (or vibration suppression control section) in a case of the vibration suppression apparatus in a second preferred embodiment according to the present invention.

DETAILED DESCRIPTION OF THE PREFERRED EMBODIMENTS

Reference will hereinafter be made to the drawings in order to facilitate a better understanding of the present invention.

(First Embodiment)

Figure 1:
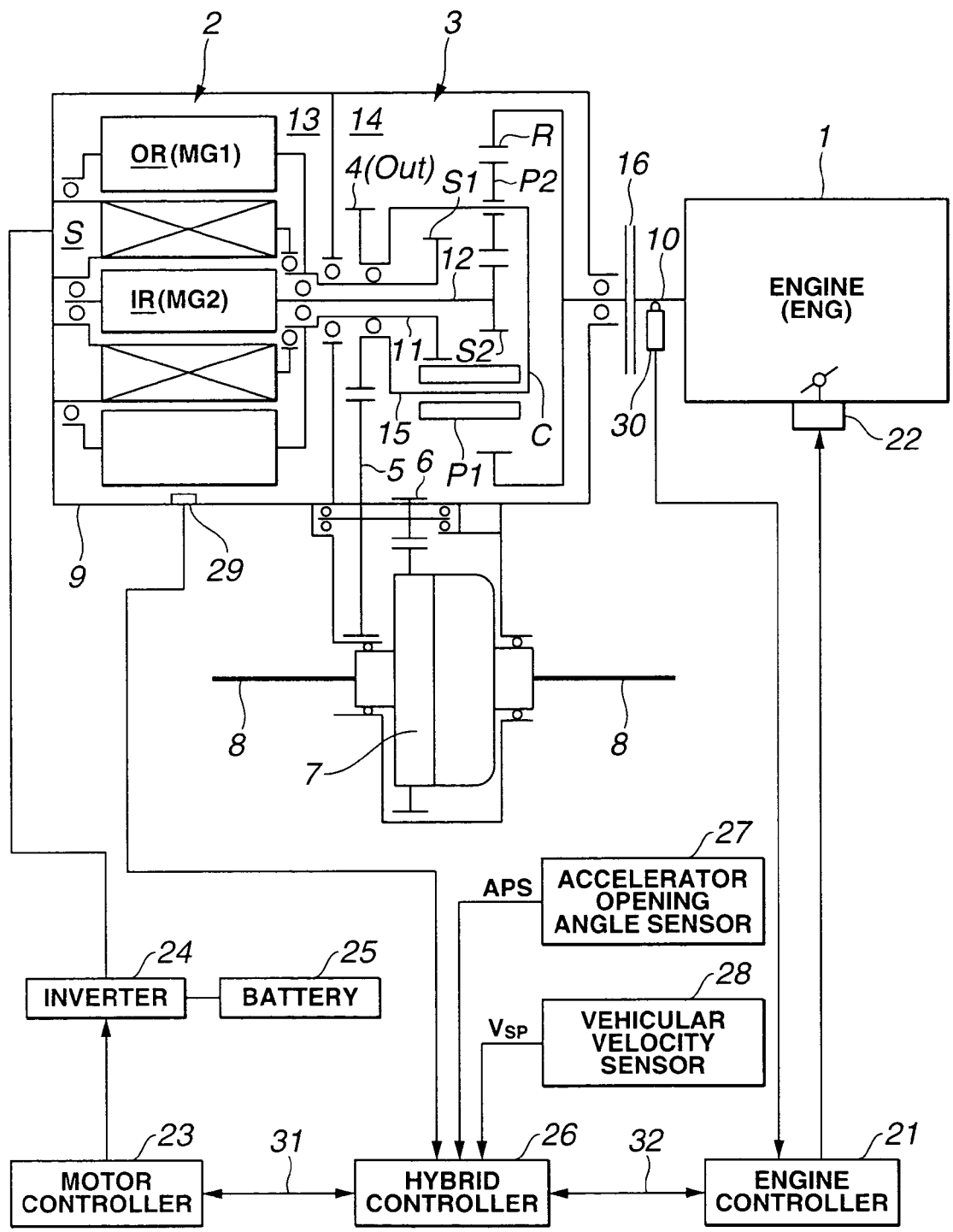
FIG. 1 is a whole system configuration view of a hybrid drive system and its control system for a hybrid vehicle and its control system for a hybrid vehicle to which a vibration suppression apparatus in a first preferred embodiment is applicable.

FIG. 1 shows a whole system configuration view representing a hybrid drive system and its control system of a hybrid vehicle to which a vibration suppression apparatus according to the present invention in a first preferred embodiment is applicable.

The hybrid drive system, as shown in FIG. 1, includes: an engine 1; a coaxial multi-layer motor 2; a Ravigneaux (type) compound planetary gear train 3; an output gear 4; a counter gear 5; a drive gear 6; a differential gear 7; drive axles 8 and 8; a motor and gear casing 9; an engine output axle 10; an output axle 11 of a first motor; an output axle 12 of a second motor (MG2); a motor chamber 13; a gear chamber 14; a drive output axle 15; and a clutch 16.

Coaxial multi-layer motor 2 is fixed to motor and gear casing 9 and includes: a stator S as a fixture (stationary) armature on which a coil is wound; an outer rotor OR arranged on an outside of stator S and into which a permanent magnet is buried; and an inner rotor IR arranged on an inside of stator S into which another permanent magnet is buried. These elements are arranged coaxially. Hereinbelow, stator S+Outer rotor OR is called first motor MG1 and stator S+inner rotor IR is called second motor MG2.

Ravigneaux (type) compound planetary gear train 3 includes four rotary elements having a first pinion P1 meshed with each other; a common carrier C supporting a second pinion P2; and a ring gear R meshed with second pinion P2. It is noted that a double pinion (type) planetary gear is constituted by first sun gear S1, first pinion P1, second pinion P2, and ring gear R and a single pinion (type) planetary gear is constituted by second sun gear S2, second pinion P2, and ring gear R.

The hybrid drive system links ring gear R and engine output axle 10 via clutch 16, links first sun gear S1 with first motor output axle 11, links second sun gear S2 with second motor output axle 12, and links common carrier C with output gear 4 (Out) via drive output axle 15. The output rotation and output torque from output gear 4 passes counter gear 5→drive gear 6→differential 7 so as to be transmitted from drive axles 8 and 8 to driven wheels (not shown). The control system of the hybrid vehicle will be described below with reference to FIG. 1. In FIG. 1, the control system of the hybrid vehicle includes: an engine controller 21; a throttle valve actuator 22; a motor controller 23; an inverter 24; a battery 25; a hybrid controller 26; an accelerator opening angle sensor 27; a vehicular velocity sensor 28; a motor temperature sensor 29; an engine speed sensor 30; and bidirectional communications lines 31 and 32. Engine controller 21 outputs a command to command a throttle valve actuator 22 to control the engine torque in accordance with a corresponding command from hybrid controller 26. Motor controller 23 outputs a command to inverter 24 to control rotation speed N1 and torque T1 of first motor MG1 and to control rotation speed N2 and torque T2 of second motor MG2 respectively independently of each other. Inverter 24 is connected to a coil of stator S of coaxial multi-layer motor 3 and generates a compound current which is a composite current of both drive currents to be caused to flow into inner rotor IR and into outer rotor OR. A battery 25 is connected to inverter 24. Hybrid controller 26 inputs sensor signals from an accelerator opening angle sensor 27, a vehicle speed sensor 28, a motor temperature sensor 29, and an engine speed sensor 30. Hybrid controller 26 carries out a predetermined calculation processing. Bi-directional communication line 31 serves to connect between hybrid controller 26 and motor controller 23. Bi-directional communication line 32 serves to connect between hybrid controller 26 and engine controller 21.

Figure 2:
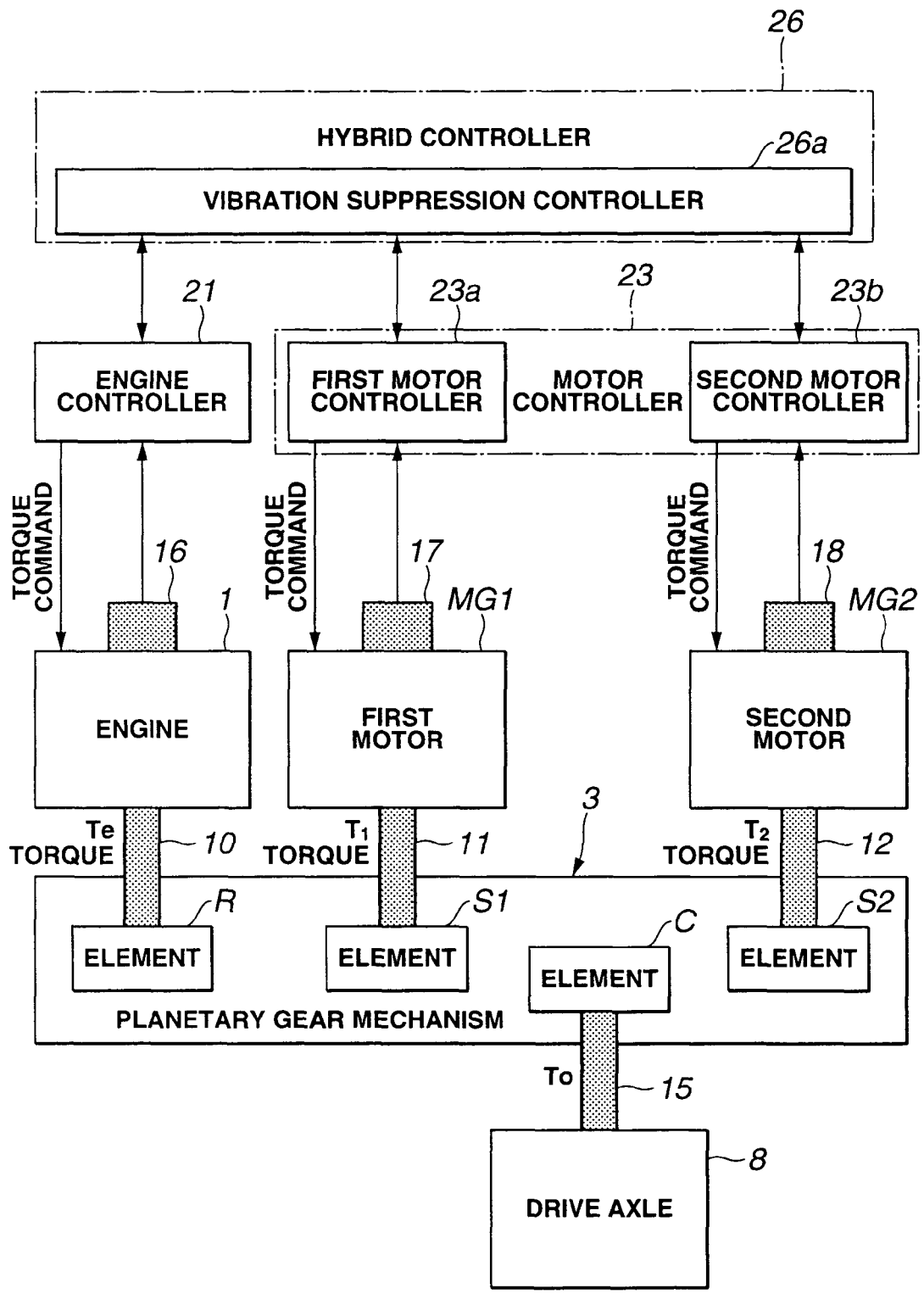
FIG. 2 is a block diagram representing a vibration suppression control apparatus in the first embodiment according to the present invention.

Next, FIG. 2 shows a block diagram representing a vibration suppressive control system of the vibration suppression apparatus according to the present invention.

In FIG. 2, engine 1 has engine output axle (coupling axle) 10 and an engine purpose speed-and-position detector 16 (a displacement measurement section (means)). First motor MG1 (an auxiliary power source) has a first motor purpose speed-and-position detector 17 (the displacement measurement section (means)) and first motor output axle 11 (coupling axle). Second motor MG2 (an auxiliary power source) has second motor output axle 12 (a coupling axle) and a second motor purpose speed-and-position detector 18 (the displacement measurement section). In FIG. 2, a reference numeral 3 denotes a Ravigneaux (type) compound planetary gear train (planetary gear mechanism) having a ring gear (an element) R, a first sun gear S1 (element), a second sun gear S1 (element), and a common carrier C (element). Common carrier C is linked with drive axle 8 (a drive output member) via drive output axle 15 (coupling axle). In FIG. 2, reference numerals 21 denote engine controller, 23a a first motor controller, 23b a second motor controller, and 23 motor controller, 26 denotes hybrid controller, 26a denotes a vibration suppression controller (vibration suppression control section (means)).

Motor controller 23 includes first motor controller 23a controlling rotation speed N1 and its torque T1 and second motor controller 23b controlling rotation speed N2 and its torque T2 of second motor 2. Each speed-and-position detector 16, 17, and 18 observes a vibration state of each element R, S1, and S2 in Ravigneaux (type) compound planetary gear train 3. These sensor signals are outputted to engine controller 21, first motor controller 23a, and second motor controller 23b. Hybrid controller 26 determines a target drive torque on the basis of the accelerator opening angle value (APS), the vehicular velocity detection value (Vsp) and a target drive torque map, determines a target torque by which engine 1 is shared and another target torque by which both of first and second motors MG1 and MG2 are shared, and outputs a target torque command to engine controller 21. On the other hand, a steady-state control for first and second motor torques T1 and T2 and a control (variable speed control) for first and second motor speeds N1 and N2 are carried out by first and second motor controllers 23a and 23b.

Figure 4:
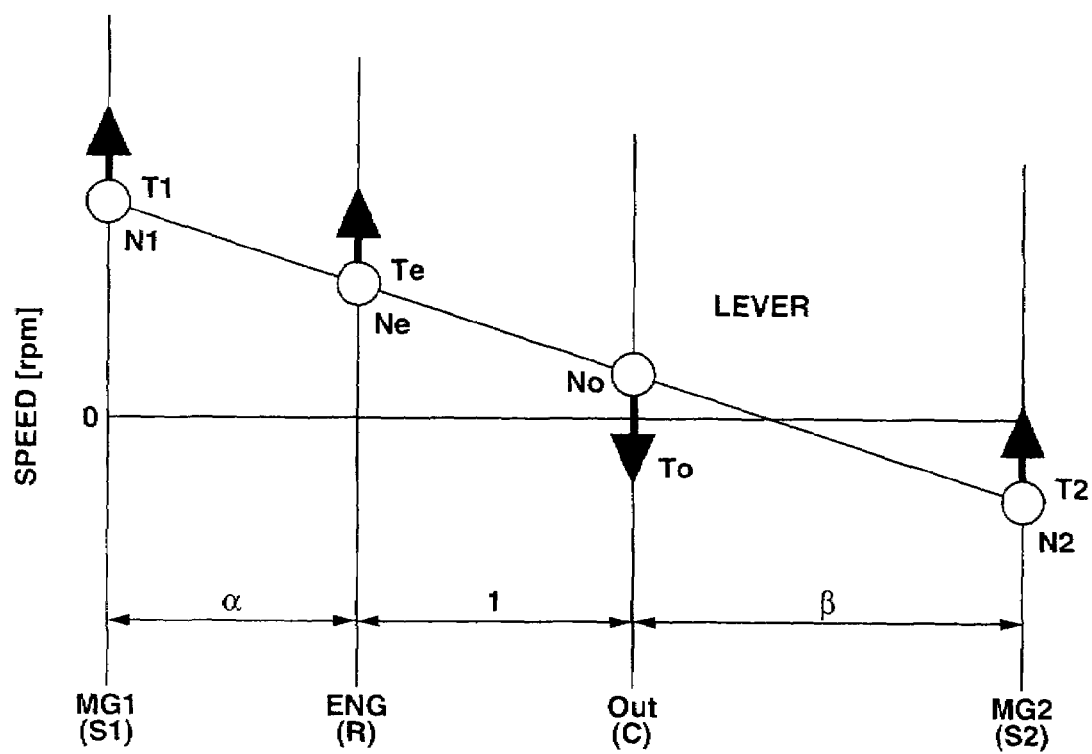
FIG. 4 is a lever diagram of Ravigneaux type compound planetary gear train used in the vibration suppression apparatus in the first embodiment shown in FIG. 2.

In the variable speed control, if engine speed Ne and gear ratio i (=Ne/No) of Ravigneaux (type) planetary gear train 3 are already known, in a lever diagram of Ravigneaux (type) compound planetary gear train 3 shown in FIG. 4, the following balance equations are established.

$$N1=Ne+\alpha(Ne-No) \quad (1)$$

$$N2=No-\beta(Ne-No) \quad (2)$$

$$To=T1+T2+Te \quad (3)$$

$$N1 \cdot N1+N2 \cdot T2=0 \quad (4)$$

$$\alpha T1+To=(1+\beta)T2 \quad (5),$$

wherein N1 and T1 denote rotation speed and torque of first motor MG1, N2 and T2 denote rotation speed and torque of second motor MG2, α and β denote gear tooth ratio of planetary gear train 3, No denotes a drive output axle rotation speed, To denotes an axial torque of drive output axle 15, and Te denotes an engine output torque.

Motor operating points (N1, T1, N2, and T2) are calculated using balance equations of (1) through (5) and a command to obtain the motor operating points (N1, T1, N2, and T2) is outputted by the hybrid controller 26.

Figure 3:
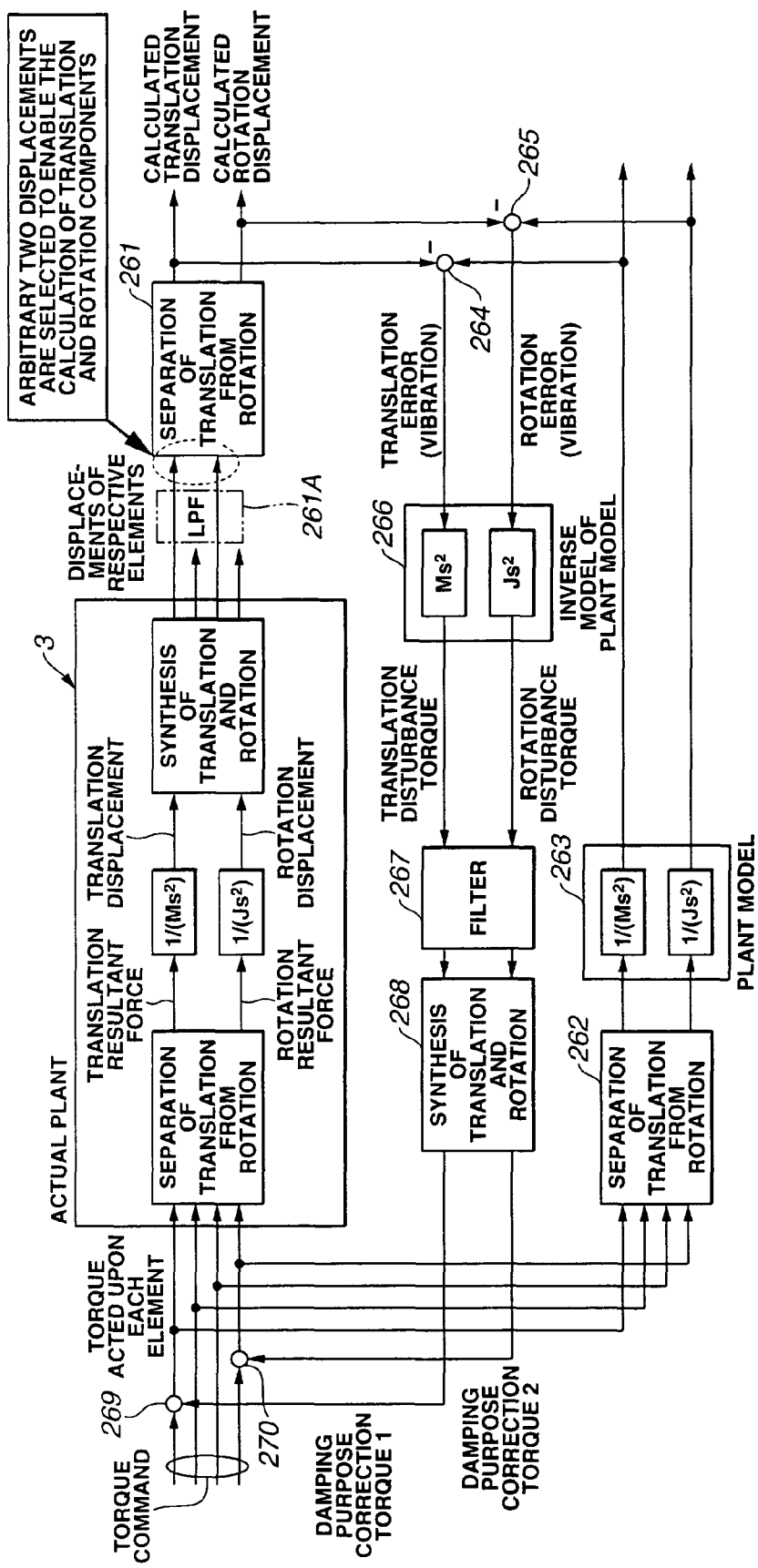
FIG. 3 is a control block diagram representing a vibration suppression controller in the vibration suppression apparatus in the first embodiment shown in FIG. 2.

Vibration suppression controller 26a of hybrid controller 26 selects both of motors MG1 and MG2 as torque controllable two power sources from among the power source and superposes the torque command signal for vibration control purpose and superposes a vibration control purpose torque command signal onto a steady state torque command obtaining motor torques T1 and T2 supplied to both motors MG1 and MG2 so as to suppress a two-degrees-of-freedom vibration of Ravigneaux (type) compound planetary gear train 3, obtaining motor torques T1 and T2 supplied to both motors MG1 and MG2. The reason of selecting both motors MG1 and MG2 from among these power sources by which the torque control is possible from among the power sources is that a torque control response of each of both motors MG1 and MG2 is superior to engine 1. FIG. 3 shows a control block diagram representing vibration suppression controller 26a in the first preferred embodiment. Vibration suppression controller 26a, when Ravigneaux (type) compound planetary gear train 3 is called an actual plant (also called, a real plant) and a vibration dynamic model of Ravigneaux (type) compound planetary gear train 3 is called a plant model, inversely calculates a (an external) disturbance torque using an inverse model of the plant model. A (damping purpose) correction torque which partially or wholly cancels the inversely calculated disturbance torque is additively supplied to first and second motors MG1 and MG2 from among power sources connected to each element of the actual plant, thus performing a control to suppress two-degrees-of-freedom vibrations of the actual plant. In FIG. 3, reference numerals 261 denote an actual displacement calculating section (separation of translation from rotation), 262 denote a displacement separation section (separation of translation from rotation), 263 denote a model displacement section (plant model), 264 denotes a translation vibration calculation section (vibration displacement calculation section), 265 denote a rotation vibration calculation section (vibration displacement calculation section), 266 denote an external disturbance torque calculating section (inverse model of plant model), 267 denote a filter processing section (filtering section) to eliminate noises, 268 denote a correction torque calculation section (synthesis of translation and rotation), 269 denotes a first correction torque adding section, and 270 denote a second correction torque adding section. Actual displacement calculating section 261 serves to calculate an actual rectilinear (or translation) displacement and actual rotation displacement at two selected elements S1 and S2 (refer to FIG. 4) of the actual plant 3 on the basis of the displacement measurement values (x1, x2). Displacement separation section 262 inputs a torque acted upon each of four element R, S1, S2, and C and separates the input respective torques into a translation torque total and a rotation torque total.

Translation vibration calculating section 264 calculates a translation error between the translation model displacement from model displacement calculating section 263 and the translation actual displacement from actual displacement calculating section 261 (translation vibration displacement).

Rotation vibration calculating section 265 calculates a rotation error between the rotation model displacement from the model displacement calculating section 263 and the rotation actual displacement from actual displacement calculating section 261. Disturbance torque calculating section 266 inversely calculates the external disturbance torques from the translation error and from the rotation error using the inverse model of the plant model of disturbance torque calculating section 266.

Filter processing section (filtering section) 267 carries out a filter processing for the translation disturbance torque from external disturbance torque calculating section 266 and that for the rotation disturbance torque therefrom in order to eliminate noises included in the signals indicative of the external disturbance torques. Correction torque calculating section 268 synthesizes the translation disturbance torque from filter processing section 267 with the rotation disturbance torque filter processed value and calculates a sign inverted vibration suppression purpose (or damping purpose) correction torque 1 and a vibration suppression correction torque 2.

First correction torque addition section 269 adds vibration suppression purpose correction torque 1 calculated by correction torque calculating section 268 to element S1 (first motor MG1). Second correction torque adding section 270 adds the calculated vibration suppression purpose correction torque 2 calculated by correction torque calculating section 268 to element S2 (second motor MG2) (refer to FIG. 3).

Next, an action of the vibration suppression apparatus in the first embodiment according to the present invention will be described below.

"Conception of the Vibration Suppression in a Case of the Present Invention"

In a generally available planetary gear mechanism used in an automatic transmission, a speed constraint between mutual elements of the planetary gear mechanism is present. Hence, degrees of freedom of motion are 2, this controls the revolution speed of the output axle and a gear ratio from the main power source to the output axle. At this time, it is widely known that a relationship in a velocity between each element can be represented by a speed diagram called a lever diagram. Ravigneaux type compound planetary gear train 3 adopted in the first preferred embodiment is an example of the planetary gear mechanism having four-element, two-degrees-of-freedom vibration. FIG. 4 shows the lever diagram of Ravigneaux (type) compound planetary gear train 3. The single pinion type planetary gear can draw a lever diagram such that, in a case where, with a carrier stopped, the sun gear is rotated in a normal direction, ring gear R is reversely rotated. In addition, the double pinion (type) planetary gear can draw another lever diagram such that, in a case where, with the carrier stopped and the sun gear rotated in the normal direction, ring gear R is rotated in the normal direction at a low revolution. Ravigneaux (type) compound planetary gear train 3 is constituted by first sun gear S1, first pinion P1, second pinion P2, and ring gear R. Hence, by combining the lever diagram of the single pinion (type) planetary gear with that of the double pinion (type) planetary gear, such a lever diagram aligned in an order from a leftmost end of FIG. 4 is a first sun gear S1 (first motor MG1), ring gear R (engine 1), common carrier C (output gear 4), and a second sun gear S2 (second motor MG2) can be drawn. From among the rotation elements, if rotation speeds N1 and N2 of first sun gear S1 and second sun gear S2 are determined, the speeds of the remaining two ring gear R and common carrier C are determined.

Figure 5:
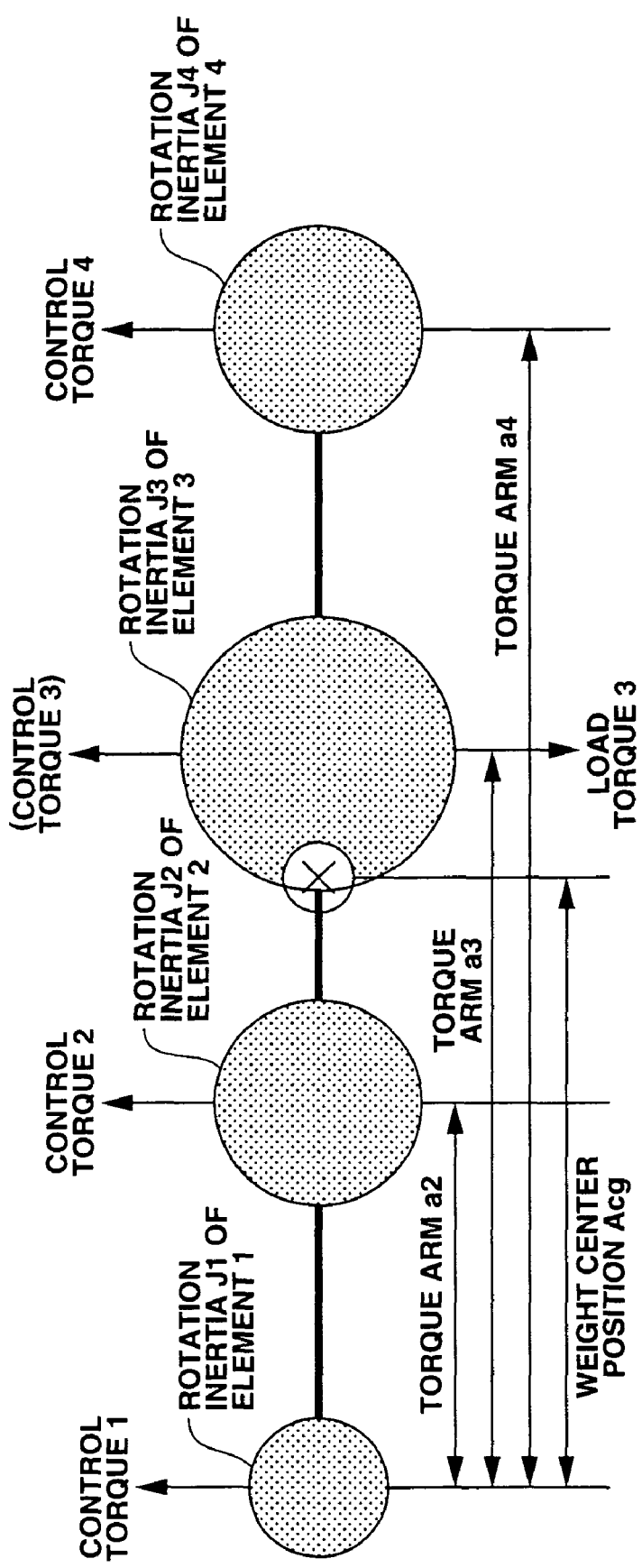
FIG. 5 is a model view of a translation inertia M and rotation inertia J in a case where a planetary gear mechanism is a four-element, two-degrees-of-freedom planetary gear mechanism (transmission) and elements 1, 2, and 4 are power sources and element 3 is a (drive) output member.

Two degrees of velocities can be expressed by independent two velocities or these arbitrary linear connections. It is easy to understand for the two-degrees-of-freedom or velocities to be analyzed into lever's translation (or rectilinear) mode and rotation mode without a dynamic (or mechanical) interference. In a case where other vehicles are selected, terms on the dynamic interference are only generated. In principle, the same result is obtained. Within a bracket representing the actual plant in FIG. 3, motions and vibrations of two-degrees-of-freedom power transmission mechanism are shown. In this bracket, two sections, each section representing an inertia, viz., $1/Ms^2$ and $1/Js^2$ are shown. These sections of $1/Ms^2$ and $1/Js^2$ indicate that degrees of freedom on the motion and vibration are two. FIG. 5 shows models of translation inertia and rotation inertia in a case of four-element, two-degrees-of-freedom planetary gear mechanism (transmission) and in a case where elements 1, 2, and 4 denote power sources and element 3 denote an output member. This model can be applied to a case where a coupling axle connecting each element of the planetary gear mechanism to the inertia of the power source is sufficiently rigid (or stiff or robust) in a frequency range to be controlled and a torsional vibration between the inertia of power source and the corresponding one of the elements of the planetary gear mechanism is not needed to be taken into consideration. In FIG. 5, an inertia of an element (for example, rotation inertia of element 4 and so on) denote a total of the element inertia and associated power source inertia.

It is noted that translation inertia M and rotation inertia J are expressed as: $M=J1+J2+J3+J4$ and $J=J1Acg^2+J2(Acg-a2)^2+J3(Acg-a3)^2+J4(Acg-a4)^2$, wherein $Acg=(a2J2+a3J3+a4J4)/M$ and torque arms a2, a3, and a4 denote non-dimensional (dimensionless) values determined from the gear ratio of the planetary gear mechanism.

Although phrase of "superposing a vibration suppression control signal onto each of torque commands supplied to two power sources" described in WHAT IS CLAIMED IS:, steady-state torque commands are determined from a torque balance of the planetary gear mechanism. The torque balance of the planetary gear mechanism is determined from the velocity of each element of the planetary gear mechanism and the velocity of each element is determined from other constraint conditions such as power performance optimization and fuel consumption optimization (refer to the balance equations of (1) through (5) described above).

That is to say, a vibration suppression effect can be achieved by superposing the vibration suppression control (damping purpose) signal on the steady state torque commands without modification of the velocities determined according to each element determined by each kind of optimization.

[Vibration Suppression Control Operation]

FIGS. 6A and 6B show integrally an operational flowchart representing a flow of a vibration suppression control operation executed by vibration suppression controller 26a in the first preferred embodiment. At a step S1, actual displacement calculating section 261 (refer to FIG. 3) calculates translation displacement and rotation displacement of actual plant 3 from at least two measurement values by means of speed (velocity) and position detectors 17 and 18 of first motor MG1 and second motor MG2 from among the displacements of the respective elements. Suppose that the measurement values are x1 and x2 (element 1, element 2) and torque arms from their respective weight centers to their respective weight centers are a and b (element 1 to whole weight center and element 2 to whole weight center and element 1 to whole weight center). At this time, a calculation equation of each of translation displacement and rotation displacement is expressed in a matrix equation described in a bracket of step S1 in FIG. 6A.

That is to say, $$\begin{bmatrix} \text{translation displacement} \\ \text{rotation displacement} \end{bmatrix} = \begin{bmatrix} 1 & a \\ 1 & -b \end{bmatrix}^{-1} \begin{bmatrix} x1 \\ x2 \end{bmatrix}.$$

At a step S2, translation torque total and rotation torque total are calculated from a torque acted upon each element at displacement separation section (separation of translation from rotation) 262 (refer to FIG. 3) and the routine goes to a step S3. At step S3, model displacement calculating section (plant model) 263 calculates the translation displacement and rotation displacement with translation torque total and rotation torque total as inputs of the plant model. Each calculation equation is expressed as follows:

Translation displacement=double integrals of (translation torque total/M) with respect to time.

Rotation displacement=double integrals of (rotation torque total/J) with respect to time. It is noted that translation inertia M and rotation inertia J are described in the above equations and FIGS. 3 and 5.

At a step S4, translation vibration calculating section 264 and rotation vibration calculating section 265 derives differences (errors or vibration displacements) between each of the translation displacements of the plant model and the actual plant and of the rotation displacements thereof. At a step S5, (external) disturbance calculating section 266 (refer to FIG. 3) inversely calculates the difference in the translation displacement and the difference in the rotation displacement to their respectively corresponding disturbance torques (double differentiation). At a step S6, filter processing section 267 carries out the filter processing for the disturbance torque values, viz., the translation disturbance torque and the rotation disturbance torque from disturbance torque calculating section 267 in order to eliminate noises included in the signals. At a step S7, correction torque calculating section 268 inputs translation disturbance torque filtered value and synthesizes them to damping torques 1 and 2 for the selected two elements S1 and S2. A calculation equation on damping torques 1 and 2 is described in a bracket of step S7 in FIG. 6B. That is to say, $$\begin{bmatrix} \text{damping torque } 1 \\ \text{damping torque } 2 \end{bmatrix} = \begin{bmatrix} 1 & p \\ 1 & -q \end{bmatrix}^{-1} \begin{bmatrix} \text{translation torque} \\ \text{rotation torque} \end{bmatrix},$$

wherein torque arms between the selected two elements and weight center are p and q. Then, first correction torque calculating section 269 and second correction torque calculating section 270 add the synthesized damping torque 1 and synthesized damping torque 2 to their corresponding torques T1 and T2 of first motor MG1 and second motor MG2.

[Vibration Suppression Action of Power Transmission Mechanism by Means of a Comparison with a Previously Proposed Vibration Control Method]

In a case where the vibration of the power transmission mechanism occurs or may occur with a high possibility under a state in which the driving state and torque distribution are determined, a method in which a motion state of a vibration occurrence is avoided by shifting the torque vibration, as described in paragraph No. [0007] in page 3 of a Japanese Patent Application First Publication No. 2001-315550 published on Nov. 13, 2001 has been adopted. This unnecessarily deviates from the actual optimum condition or an increase in numbers of the power sources causes an increase in a redundancy manner so that a solution balancing between each kind of optimization and a reduction of vibrations is derived. At any rate, since the torque distribution and operating point are deviated from a torque distribution and operating point with, at an initial stage, only the optimization as a target, the optimization is not achieved. In consecutive paragraphs of [0009] and [0010] described in pages (3) of the above-described Japanese Patent Application First Publication No. 2001-315550, such an example as described above is described. That is to say, to suppress the vibration of the vehicle, a method in which a combination of the engine and a target power of the motor causes a region in which a lock up is carried out to be determined. As described above, in a case where one or plural power sources provide vibration sources under a certain condition in a previously proposed vehicular vibration control method, the gear ratio is shifted so as to avoid the certain condition, specifically, a certain combination between the rotation speed (velocity) of the above-described power source(s) and torque thereof. In such a method as described above, in a case where, as a result of a certain optimization between the power source(s) and the torque thereof is demanded, it is apparent that the vibration cannot be suppressed while satisfying this demand. That is to say, in a state where even under any rotation speed and torque driving state of every power source, a part or all of the power sources provide the vibration sources, it becomes necessary to execute the driving state while suppressing positively the vibrations.

Furthermore, since, in such a multi-element, multi-degree-of-freedom power transmission mechanism as described above, backlashes caused by clearances between the respective gears and elastic materials are intentionally or unavoidably present between each of the power sources and each of the gears, the planetary gear itself may be considered to provide complex and non-linear vibration generation source or vibration amplifier. In such a case as described above, it is necessary not only to avoid a vibration generation region but also to avoid a vibration generation-and-amplification region of the whole power transmission mechanism. Accordingly, the degree of freedoms on the driving state is limited and a worsening of a target to be optimized such as the power performance of the vehicle or fuel consumption (economy) thereof is resulted. In addition, since the vibration has a wide range of conditions and it is not practical to avoid all of vibrations inclusively, a light degree of vibration is left (neglected). Such a minute vibration as described above gives an ill effect on a life of each component of the power transmission mechanism so as to be avoided. Thus, it is necessary to provide means not only for avoiding the vibration state but also for positively suppressing the vibration.

On the other hand, in the vibration suppression apparatus in the first embodiment, a positive vibration suppression method is adopted. That is to say, in this method, such a problem as will be described below is carried out. An output error between an actual plant (or real plant) and the plant model is caused by only the disturbance torque and is inversely calculated (since torque→translation displacement and rotation displacement are carried out under the double integrals, the inverse calculation is double differentiations) and the inversely calculated displacements are added (superposed) as the correction torque command to the steady state torque commands T1 and T21 of both of first and second motors MG1 and MG2 to each of which the corresponding one of the selected two power sources is coupled. In other words, such a method that the vibration disturbance torque which provide a source of the vibration is cancelled by a torque compensation. In addition, since, in the vibration suppression apparatus in the first embodiment, the actual plant and its model (plant model) are treated as two-degrees-of-freedom motions. In the former previously proposed vibration suppression apparatus disclosed in the Japanese Patent Application First Publication No. 2000-217209, the vibration of the actual plant is suppressed as the one-degree-of-freedom motion. In the formed previously proposed vibration suppression apparatus, in a case where the residual vibration of the output axle torque of the planetary gear mechanism is present (or left thereon), such a problem that a wear of the elements within the planetary gear mechanism occurs. However, this problem can be eliminated in the case of the vibration suppression apparatus in the first embodiment. In the former previously proposed vibration suppression apparatus disclosed in the same Japanese Patent Application First Publication, in another case where the vibration within the planetary gear mechanism is reduced as low as possible, the vibration on the output axle torque is left. Such problems that a vehicular comfortability is not only lost but also a wear of a power transmission element which is located at a downstream position with respect to a final speed-reduction (final differential gear) unit occur. However, these problems can be eliminated by the use of the vibration suppression apparatus in the first embodiment. Consequently, the vibrations of the two-degrees-of-freedom developed in Ravigneaux (type) compound planetary gear train 3 can effectively be suppressed.

Next, advantages of the vibration suppression apparatus in the first embodiment will be described below.

(1) In the hybrid vehicle having the main power source, the plurality of auxiliary power sources, and the plurality of auxiliary power sources, and the planetary gear mechanism to modify the gear ratio when an output of the main power source is transmitted to drive output member, two torque controllable first motor MG1 and second motor MG2 from among the power sources coupled to the planetary gear mechanism 3 are selected, the vibration control (suppression) purpose signals are superposed on torque commands T1 and T2, each of the torque commands being supplied to the corresponding one of first motor and second motor MG1 and MG2. Since the vibration suppression controller 26a to suppress the two-degrees-of-freedom vibrations in the planetary gear mechanism is installed, the two-degrees-of-freedom vibrations can effectively be suppressed. Consequently, without sacrifice of a durability of the components (elements) of the planetary gear mechanism, a strength thereof is lowered and a manufacturing cost thereof can accordingly be reduced. When the cost can be reduced, the vibration of the drive output torque and unpleasant noises can be reduced.

(2) When the planetary gear mechanism is set to be the actual (or real) plant and the vibration dynamic (mechanical) model of the vibrations of the planetary gear mechanism is set to be the plant model, vibration suppression controller 26a inversely calculates the disturbance torque using the inverse model of the plant model and adds the correction torque which cancels a part or whole disturbance torque into two power sources from among the power sources coupled to each element of the actual plant to suppress the two degrees-of-freedom vibration of the actual plant. Hence, an acting force by which the vibration is caused to be generated from among the forces acted upon the planetary gear mechanism can be estimated with a high accuracy using the plant model and an inverse model of the plant model. Consequently, two-degrees-of-freedom vibrations in the planetary gear mechanism can effectively be suppressed.

(3) Speed-and-position detectors 16, 17, and 18 are installed which measure the displacements of the respective elements developed according to the torque acted upon each element of the actual plant, vibration suppression controller 26a includes: actual displacement calculating section 261 to calculate the actual displacements using the torques acted upon the respective elements and displacement measurement values; model displacement measurement values; model displacement calculating section 263 to calculate model displacement using the torque acted upon the respective elements and plant model; translation vibration calculating section 264 and rotation vibration calculating section 265 to calculate a vibration displacement which is the error between the actual plant displacement and the plant model displacement; disturbance torque calculating section 266 which inversely calculates the disturbance torque using the calculated vibration displacement and the inverse model of the plant model; a correction torque calculating section 268 to calculate the correction torque whose sign of the calculated disturbance torque is inverted; and correction torque addition sections 269 and 270 to add the calculated correction torque to the power sources to which the selected two elements are coupled. Therefore, the vibration suppression controller 26a serves as a control damper generating a damping force for Ravigneaux (type) compound planetary gear train 3 which is a power transmission mechanism. The vibrations of Ravigneaux compound planetary gear train 3 can effectively be damped (attenuated).

(4) Vibration suppression controller 26a selects first motor MG1 and second motor MG2 each of which is superior in the torque control response from among torque controllable three power sources and superposes the vibration control (suppression control) purpose signal on the steady state torque commands T1 and T2 to be supplied to these two selected first and second motors MG1 and MG2 so that the two-degrees-of-freedom vibrations of the planetary gear mechanism are effectively suppressed. Even if a variation in the torque control response of each power source as an actuator to suppress the vibration is present, the two-degree-of-freedom vibrations generated on Ravigneaux (type) compound planetary gear train 3 of the transmission mechanism can speedily be suppressed.

(5) Since the main power source is engine 1, the plurality of auxiliary power sources are two of first and second motors MG1 and MG2, the planetary gear mechanism is the four-element, two-degrees-of-freedom planetary gear mechanism expressed in the lever diagram in which engine 1 and output gear 4 are aligned between two motors MG1 and MG2 (refer to FIG. 4), and vibration suppression controller 26a superposes the vibration control (suppression) signal onto steady state torque commands T1 and T2 to be supplied to the selected two motors of first and second motors MG1 and MG2 disposed on both ends of the lever diagram, particularly, the rotation mode vibrations from among the two-degrees-of-freedom vibrations developed on Ravigneaux (type) compound planetary gear train 3 which is the power transmission mechanism can effectively be suppressed, and the costs of engine mount damper and motor mount damper can be reduced. That is to say, it is usual practice that a damper constituted by a spring and a mass to reduce ripples of motor output axles 11 and 12 is installed on engine output axle 10. The rigidities of motor output axles 11 and 12 are larger than the rigidity of engine output axle 10. In addition, if Ravigneaux (type) compound planetary gear train 3 is expressed in the lever diagram, motor output axles 11 and 12 to suppress the vibrations are coupled to both ends of the lever diagram. Hence, the vibrations in the rotation mode of Ravigneaux (type) compound planetary gear train 3 can effectively be suppressed. As a result of this, without sacrifice of the durability of the compounds of Ravigneaux (type) compound planetary gear train 3, the strength thereof can be decreased and the manufacturing cost can be reduced. In details, since the size and weight of spring and mass of the damper can be reduced, the cost of the engine damper can be reduced. Furthermore, since the variations in the output torque can effectively be reduced, a necessity of reducing the torque ripples by means of the damper of engine output axle 10 can be reduced within a range of an impediment of a smooth rotation of engine 1. In other words, since the size and weight of spring and/or mass of the damper can be reduced, the cost of the engine damper (engine mount) can be reduced. The, due to the minute velocity (speed) vibration and the variation of the generation torque to correct the minute velocity (speed) vibration, a magnetic flux within a motor iron core is resulted in having the ripple thereof. This causes an iron loss within the iron core to be increased. The vibration suppression control causes the minute speed vibration to be reduced. The iron loss can be reduced from the reduction in vibration of the magnetic flux in the iron core. A thermal energy of the motor is equivalently increased so that a capacity of the motor can nearly fully be used. The increase in the thermal capacity of the motor can be utilized in the decrease in the manufacturing cost.

(6) Since the main power source is engine 1 and the plurality of auxiliary power sources are coaxial multi-layer motor 2 having a single stator S and two rotors IR and OR and Ravigneaux (type) compound planetary gear train 3 expressed in the lever diagram in which engine 1 and output gear 4 are aligned in the lever diagram between two motors MG1 and MG2, there are greater advantages in terms of the cost, the size, and the efficiency as compared with a case where two independent motors are adopted and the planetary gear can be compacted in its axial direction as compared with the case where the two independent motors are adopted. Furthermore, a compatibility of a combination of co-axial multi-layer motor 2 with Ravigneaux (type) compound planetary gear train 3 is favorable and can be constituted by a preferable hybrid drive system. That is to say, since two-rotor, one-stator coaxial multi-layer motor 2 is adopted, a current for inner motor IR and a current for outer motor OR are superposed to form a compound current and the compound current is caused to flow through the single stator coil so that two rotors IR and OR can respectively be controlled independently of each other. In details, although, in terms of an outer appearance, this is a single coaxial multi-layer motor 2 and this combination can be used as different or same kind of functions of motor function and generator function. Hence, as compared with a case where two independent motors having the rotors and stators, respectively, are installed, greater advantages can be obtained in terms of the cost (reduction in number of parts, reduction in an inverter current rating, and reduction in magnet number), the size (miniaturization in terms of coaxial structure, and reduction in inverter size), and the efficiency (reduction in iron loss and reduction in inverter loss). In addition, only a control over the compound current can achieve a usage of not only the motor and the generator but also the generator and the generator. In the way described above, a high degree of selection of freedom can be provided. For example, as described in the first embodiment, in the case where the coaxial multi-layer 2 is adopted in drive sources of the hybrid vehicle, a most effective or most efficient combination can be selected in accordance with the driving condition from among a multiple number of selections.

Ravigneaux (type) compound planetary gear train 3 achieves the combination of four planetary gears (two parallel longitudinal planetary gears and two crossing forward-rearward direction planetary gears) although a width size is two-train planetary gears. Hence, for example, as compared with an axial alignment of four planetary gears, an axial directional size can be shortened. In a case where coaxial multi-layer motor 2 and Ravigneaux (type) compound planetary gear train 3 are applied to the hybrid vehicle drive system, since they are mutually of the coaxial structure, the output axles 11 and 12 of the coaxial multi-layer motor 2 and sun gears S1 and S2 of the co-axial multi-layer motor 2 and sun gears S1 and S2 of Ravigneaux (type) compound planetary gear train 3 can simply be linked together by means of, for example, a spline coupling. The compatibility of the combination is very favorable (good) and this combination is extremely advantageous from the standpoints of space, cost, and weight. In a case where one of coaxial multi-layer motor 2 is used as a discharger (motor) and the other thereof is used as a generation (generator), it is possible to control the motor current via single inverter 24. A discharge from battery 25 can be reduced. For example, in a case of a direct power distribution control mode in which the balance equations (1) through (5) described above are established, theoretically, the discharge from battery 25 can be zeroed. In a case where both rotors IR and OR of coaxial multi-layer motor 2 are used as motors together with the single stator S, a range of the drive of the hybrid vehicle can be widened.

(Second Embodiment)

In the first embodiment, the vibration disturbance torques causing the vibrations are directly cancelled by means of a, so-called, torque compensation method. However, in the second embodiment, the vibrations caused by the vibration disturbance torques are speedily damped (attenuated) by means of a controllable damping torque method. That is to say, vibration suppression controller 26a, as shown in FIG. 7, includes: actual displacement calculating section 261 that calculates the translation displacement and the rotation displacement of the actual plant using the torque acted upon each element in the actual plant and the displacement measurement values; a damping torque calculating section 271 that calculates a translation damping torque and a rotation torque damping torque using the actual translation and rotation displacements and an electrical damper (also called an electric damper or called an attenuator); filter processing (filtering) section 267 that eliminates noises from the translation damping torque and from the rotation damping torque; a correction torque calculating section 268 that synthesizes a filtered value of the translation damping torque and the filtered value of the rotation damping torque and calculates a vibration suppression (or damping purpose) correction torque 1 and a vibration suppression (damping purpose) correction torque 2, each sign of correction torques 1 and 2 being inverted with respect to the translation and rotation displacements; a first correction torque adding section 269 that additively supplies the vibration suppression (damping purpose) correction torque 1 to element S1 (first motor MG1); and a second correction torque adding section 270 that additively supplies the vibration suppression (damping purpose) correction torque 2 to element S2 (second motor MG2). It is noted that since other structures as described in the first embodiment are generally the same as those of the second embodiment, the detailed description thereof will be omitted herein.

The action of the second embodiment will be described below. Actual displacement calculating section 261 calculates the translation displacement and the rotation displacement using the torque acted upon each element of the actual plant (Ravigneaux type compound planetary gear train 3) and displacement measurement values. At damping torque calculating section 271, the translation and rotation damping torques are calculated using the translation displacement, rotation displacement, and the electrical (electric) damper. At filtering (processing) section 267, the noises are eliminated from the translation damping torque and from the rotation damping torque. At correction torque calculating section 268, the translation damping torque filtered value is synthesized to the rotation damping torque to calculate sign inverted vibration suppression (damping purpose) correction torques 1 and 2. Vibration suppressing correction torque 1 is additively supplied to element S1 (first motor MG1) at first correction torque adding section 269 and vibration suppressing correction torque 2 is additively supplied to element S2 (second motor MG2) at second correction torque adding section 270.

Next, the advantage that the vibration suppression apparatus in the second embodiment will be described below. Since the vibration suppression apparatus for the hybrid vehicle in the second embodiment, damping torque calculating section 271 is disposed to calculate the translation damping torque and the rotation damping torque using the translation displacement, the rotation displacement, and the electrical (electric) damper, a simple vibration suppression controller 26a without use of the plant model can be achieved. In addition, the vibrations caused by the vibration disturbance torques can speedily be damped by means of the controllable damping torque (damping purpose correction torques). It is noted that $C_Ms$ and $C_Js$ described in block 271 denote transfer functions of the electrical (electric) damper.

(Third Embodiment)

In the second embodiment, the translation and rotation damping torques are determined using the translation displacement, the rotation displacement, and the electrical (electric) damper. However, in a third embodiment of the vibration suppression apparatus according to the present invention, using the errors in the translation and rotation displacements between the actual plant and plant model and the electrical (electric) damper (or attenuator described above), the translation and the rotation damping torques are determined.

Figure 8:
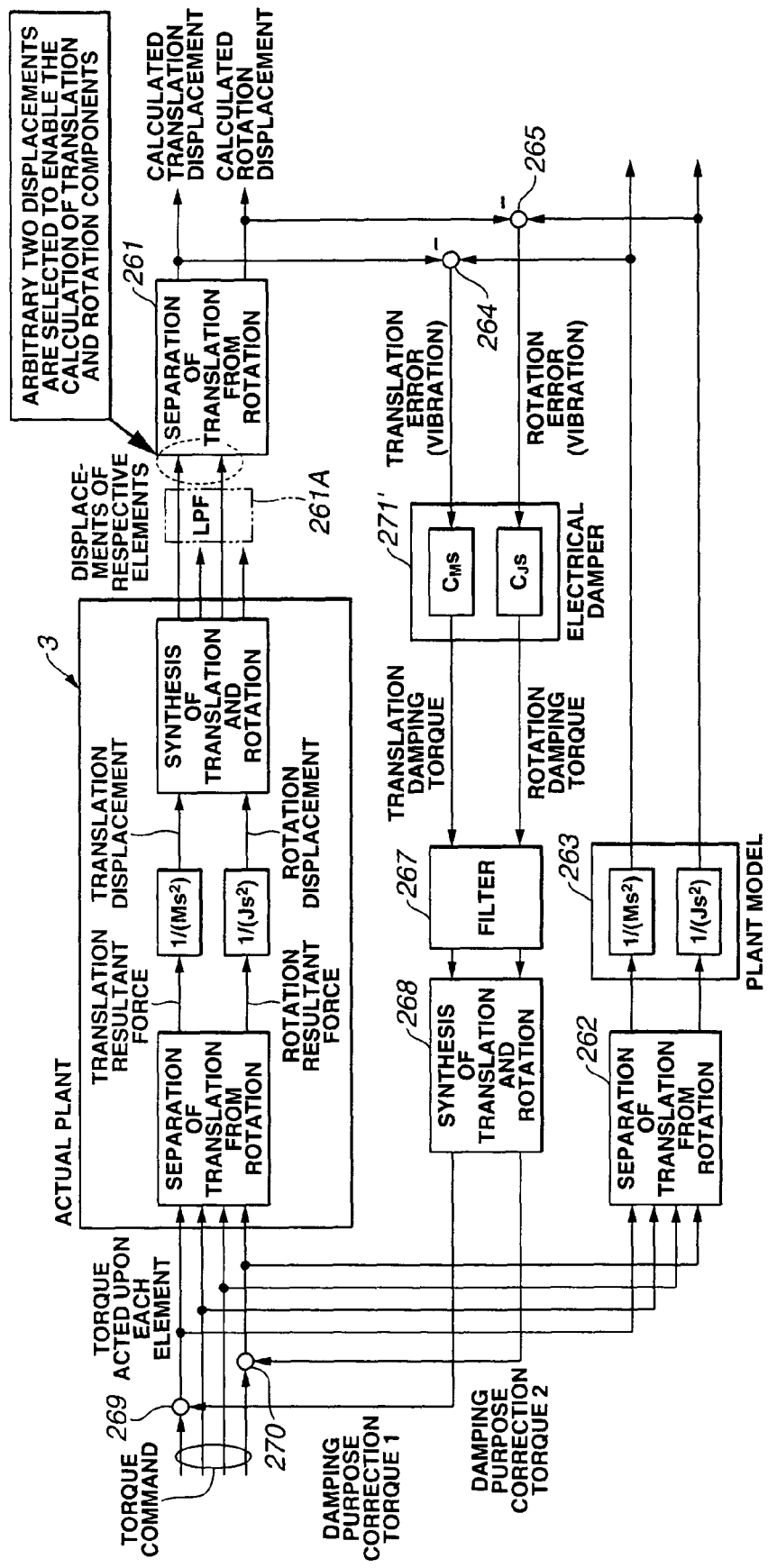
FIG. 8 is a control block diagram representing the vibration suppression control apparatus in a third preferred embodiment according to the present invention.

That is to say, as shown in FIG. 8, the vibration suppression controller 26a in the third embodiment includes: displacement separating section 262 that inputs (receives) torques acted upon respective elements R, S1, S2, and C of Ravigneaux (type) compound planetary gear train 3 and that separates the torques into translation torque total and the rotation torque total; a model displacement calculating section 263 that calculates a translation model displacement and a rotation model displacement at selected two elements S1 and S2 using the translation torque total and the rotation torque total both from displacement separation section 262 and the plant model; a translation vibration calculating section 264 that calculates the error in the translation (a translation vibration causing the displacement) which is an error between the translation model displacement from model displacement calculating section 263 and the actual translation displacement from actual displacement calculating section 261; and a rotation vibration calculating section 265 that calculates the error of the rotation (rotation vibration displacement) between the rotation model displacement from model displacement calculating section 263 and the rotation actual displacement from actual displacement calculating section 261, in addition to the structure in the case of the second embodiment.

The action of the third embodiment will be described below. A damping torque calculating section 271' calculates the translation damping torque and the rotation damping torque using the error in the translation displacement, the error in the rotation displacement, and the electrical (electric) damper. Filtering section 267 eliminates noises from the translation damping torque and the rotation damping torque. Correction torque calculating section 268 synthesizes the translation damping torque filtered value and rotation damping torque filtered value to calculate the sign inverted vibration suppression correction torque 1 and the sign inverted vibration suppression correction torque 2. First correction torque calculating section 269 additively supplies the vibration suppression correction torque 1 to element S1 (first motor MG1) and second correction torque calculating section 270 additively supplies the vibration suppression correction torque 2 to element S2 (second motor MG2).

Next, advantage of the third embodiment will be described below. In the vibration suppression apparatus for the hybrid vehicle in the third embodiment, damping torque calculating section 271' to calculate the translation damping torque and the rotation damping torque using the translation displacement error described above, the rotation error described above, and the electrical (electric) damper is provided. The impediment of the velocity control of the planetary gear mechanism becomes a few as compared with the vibration suppression control method executed in the second embodiment.

(Fourth Embodiment)

Figure 9:
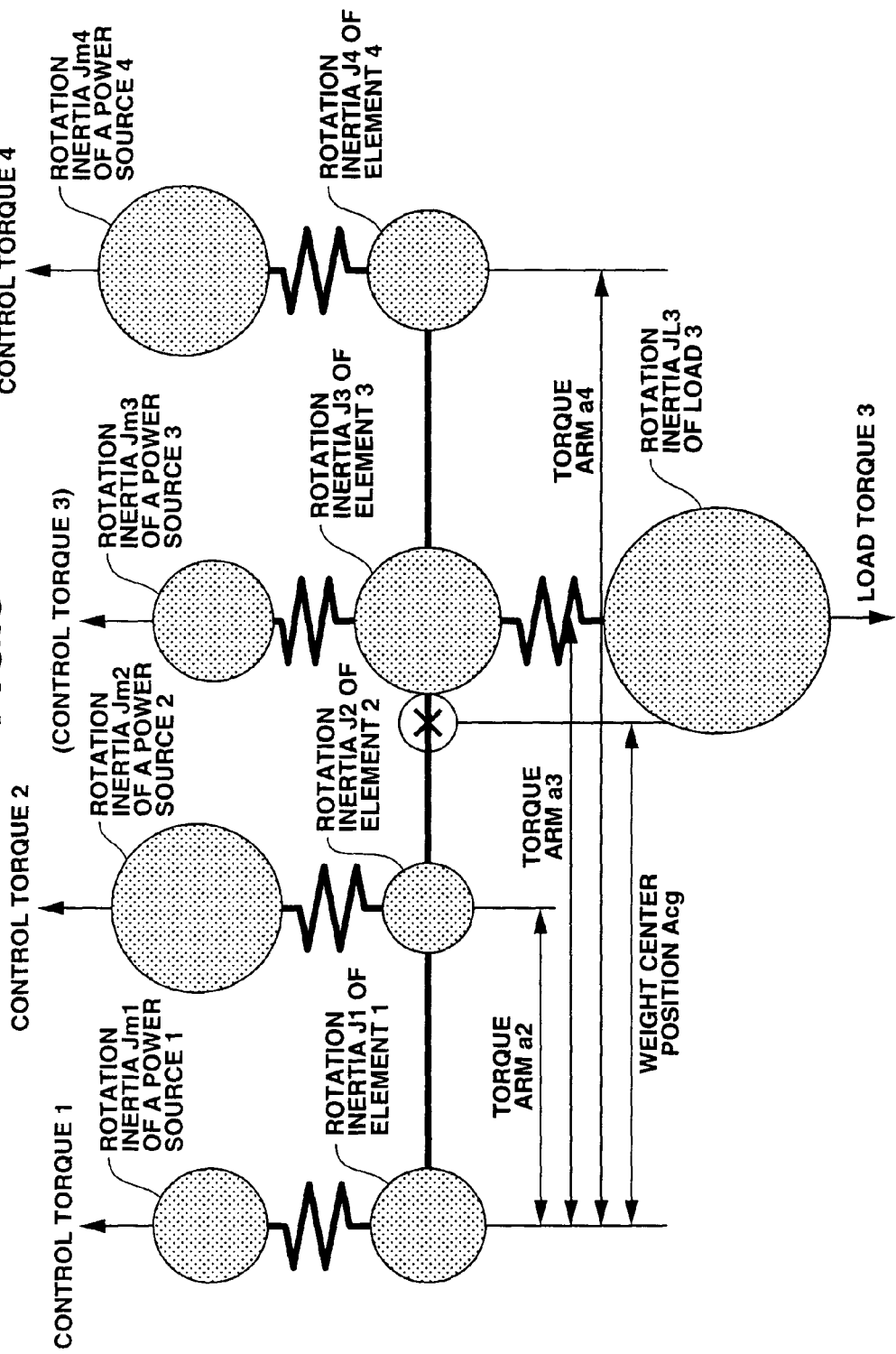
FIG. 9 is a vibration model view of a four-element, two-degrees-of-freedom planetary gear mechanism (transmission) in a fourth preferred embodiment according to the present invention.

The vibration suppression apparatus in a fourth preferred embodiment according to the present invention will be described below. In the first, second, and third embodiments, an example having such a high rigidity that torsional vibrations between each power source and its coupling axle and between each element of the planetary gear mechanism are negligible is supposed. On the other hand, in the fourth embodiment, such an example that elastic vibration torsional vibrations between each power source and its coupling axle and between each element of the planetary gear mechanism are not negligible is suppressed. FIG. 9 shows a vibration model of a four-element, two-degrees-of-freedom planetary gear mechanism (transmission). In the fourth embodiment, a control torque of one of the power sources connected to the selected two axles having high rigidities is used to suppress the vibrations. It is noted that, if translation inertia is denoted by M and rotation inertia is denoted by J, inertias M and J can be expressed as follows: $M=J1+J2+J3+J4$, $J=J1Acg^2+J2(Acg-a2)^2+J3(Acg-a3)^2+J4(Acg-a4)^2$, wherein $Acg=(a2J2+a3J3+a4J4)/M$ and torque arms a2, a3, and a4 are dimensionless values determined from gear ratio of the planetary gear mechanism. Suppose that power sources of 1 and 4 are selected in the way as described above and with these elastic coupling axles directly coupled, the vibration suppression apparatus can be executed using the control section of the vibration suppression controller 26a shown in each of FIGS. 3, 7, and 8. In this case, J1 and J4 shown in FIG. 9 are replaced with J1+Jm1 and with J4+Jm4, respectively. That is to say, $M=J1+Jm1+J2+J3+J4+Jm4$, $J=(J1+Jm1)Acg^2+J2(Acg-a2)^2+J3(Acg-a3)^2+(J4+Jm4)(Acg-a4)^2$, wherein $Acg=(a2J2+a3J3+a4(J4+Jm4))/M$. Furthermore, it is necessary to insert such a low pass filter (LPF 261A in each of FIGS. 3, 7, and 8) that does not pass the vibration components whose frequencies are equal to or higher than one of the frequencies of resonance frequencies of coupling axles coupling the selected power sources 1 and 4 to the corresponding elements (first element 1 and fourth element 4, refer to FIG. 9) detecting section of the calculated translation inertia and the rotation inertia in each in FIGS. 3, 7, and 8. A position of the above-described low pass filter may be placed in front of or behind of the section (for example, 261) in each of FIGS. 3, 7, and 8 in which separation of translation from rotation is described.

Next, the advantages of the vibration suppression apparatus for the hybrid vehicle in the fourth embodiment will be described below. That is to say, in the vibration suppression apparatus for the hybrid vehicle in the fourth embodiment, vibration suppression controller 26a selects the power sources to which the coupling axles having two high resonance frequencies from among the resonance frequencies on a torsional vibration system coupling between the respective elements of the planetary gear mechanism and each power source, superposes the vibration control purpose signals (damping purpose correction torques 1 and 2) on the torque commands given to the two elements to each of which the corresponding one of the two selected power sources is coupled via the corresponding one of the coupling axles to suppress the two-degrees-of-freedom vibrations of the planetary gear mechanism. Hence, even if the torsional vibrations occur on the coupling axles coupling the power sources as the actuator to suppress the vibration to the respective elements of the planetary gear mechanism, the two-degrees-of-freedom vibrations developed on the planetary gear mechanism can speedily be suppressed up to a highest frequency within a range in which no excitation for the torsional vibration occurs. Consequently, without sacrifice of the durability of the elements of the planetary gear mechanism, the strength (intensity) can be lowered and the manufacturing cost thereof can accordingly be reduced. In addition, the vibrations of the drive output torque and unpleasant noises can be reduced.

The vibration suppression apparatus for the hybrid vehicle according to the present invention has been described with reference to the first, second, third, and fourth preferred embodiments. A specific structure is not only limited to the first, second, third, and fourth embodiments. Various changes and modifications may be made without departing from the sprit and the scope of the present invention. In each of the first, second, third, and fourth embodiments, the vibration suppression section is separated into the translation mode and rotation mode. The vibration suppression section may be separated into the displacement of element 1 and that of element 2. In each of the first, the second, the third, and the fourth embodiments of the vibration suppression apparatus according to the present invention, first motor MG1 and second motor MG2 are constituted by coaxial multi-layer motor 2 having common stator S and two rotors IR and OR and functionally achieving two motors although, in appearance, coaxial multi-layer motor 2 is a single motor.

Figure 10:
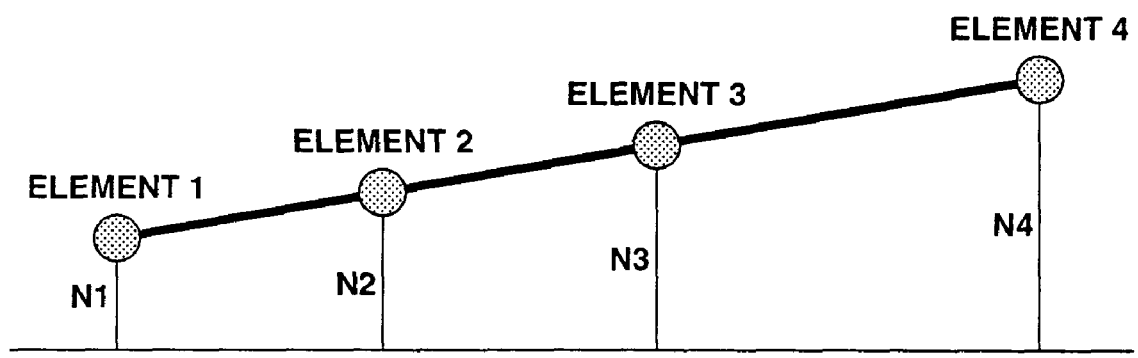
FIG. 10 is a lever diagram representing the four-element planetary gear mechanism.

In each of the first, the second, the third, and the fourth embodiments, the planetary gear mechanism is constituted by, as an application example, Ravigneaux (type) compound planetary gear train 3. However, the planetary gear mechanism is not limited to Ravigneaux (type) planetary gear train 3 but may be constituted by the planetary gear having at least four elements and two degrees of freedom to couple the four elements of the engine, the first motor, the second motor, and the output member. That is to say, as shown by a lever diagram of FIG. 10, if any arbitrary two elements' velocities (revolutions per unit time) are determined, the remaining two element's velocities are determined. Or alternatively, if an arbitrary one element's velocity (speed) and a speed ratio between the arbitrary two elements (for example, if the engine output axle and the transmission output axle are selected, this indicates the gear ratio) are determined, the velocities (speeds) of all elements are determined. This is represented as the four-elements, two-degrees-of-freedom planetary gear mechanism.

The entire contents of a Japanese Patent Application No. 2002-245722 (filed in Japan on Aug. 26, 2002) are herein incorporated by reference. The scope of the invention is defined with reference to the following claims.

What is claimed is:

1. A vibration suppression apparatus for a hybrid vehicle, comprising:
a main power source;
a plurality of auxiliary power sources;
a planetary gear mechanism to modify a gear ratio when an output of the main power source is transmitted to a drive output member; and
a vibration suppression control section that selects two power sources whose torque controls are enabled to be performed and superposes a vibration suppression control signal onto each of torque commands supplied to the selected two power sources to suppress two-degrees-of-freedom vibrations of the planetary gear mechanism.

2. A vibration suppression apparatus for a hybrid vehicle as claimed in claim 1 wherein the planetary gear mechanism is set to be an actual plant and a dynamic model on the vibrations of the planetary gear mechanism is set to be a plant model and the vibration suppression control section inversely calculates an external disturbance torque that causes the vibrations to be developed in the planetary gear mechanism using an inverse model of the plant model and additively supplies correction torques which cancel at least a part of the two-degrees-of-freedom vibrations of the actual plant to two power sources from among the power sources coupled to the respective elements of the actual plant.

3. A vibration suppression apparatus for a hybrid vehicle as claimed in claim 2, wherein the vibration suppression apparatus further comprises a displacement measurement section that measures displacements of the respective elements of the actual plant developed according to torques acted upon the respective elements of the actual plant and the vibration suppression control section comprises: an actual displacement calculating section that calculates actual displacements of the respective elements using the torques acted upon the respective elements of the actual plant and displacement measurement values of the displacement measurement section; a model displacement calculating section that calculates displacements of the plant model using the torques acted upon the respective elements and using the plant model; a vibration displacement calculating section that calculates an error between each of the actual displacements of the actual plant and the corresponding one of the displacements of the plant model; a disturbance torque calculating section that inversely calculates the external disturbance torques using the calculated error and an inverse model of the plant model; a correction torque calculating section that calculates a correction torque whose sign is inverted to the calculated disturbance torque; and a correction torque adding section that additively supplies the calculated correction torque to each of the two power sources to each of which the corresponding one of the selected two elements is coupled.

4. A vibration suppression apparatus for a hybrid vehicle as claimed in claim 2, wherein the vibration suppression apparatus further comprises a displacement measurement section that measures the displacements of the respective elements developed according to torques acted upon respective elements of the actual plant and the vibration suppression control section comprises: an actual displacement calculating section that calculates actual displacements of the actual plant using torques acted upon the respective elements of the actual plant and displacement measurement values of the displacement measurement section; a damping torque calculating section that calculates damping torques using the calculated actual displacements and an electrical damper; a correction torque calculating section that calculates correction torques, each of their signs being inverted to that of the corresponding one of the calculated damping torques; and a correction torque adding section that additively supplies each of the calculated correction torques to the corresponding one of the power sources to which the selected two elements are respectively coupled.

5. A vibration suppression apparatus for a hybrid vehicle as claimed in claim 2, wherein the vibration suppression apparatus further comprises: a displacement measuring section that measures displacements of the respective elements of the actual plant developed according to torques acted upon the respective elements of the actual plant and the vibration suppression control section comprises: an actual displacement calculating section that calculates actual displacements of the respective elements using the torques acted upon the respective elements of the actual plant and the displacement measurement values; a model displacement calculating section that calculates model displacements using the torques acted upon the respective elements and a plant model; a vibration displacement calculating section that calculates an error between each the actual displacements of the actual plant and the corresponding one of the model displacements of the plant model; a damping toque calculating section that calculates damping torques using the calculated errors and an electrical damper; a correction torque calculating section that calculates correction torques, each of their signs being inverted to that of the calculated damping torque; and a correction torque adding section that additively supplies the calculated correction torque to the selected two power sources to each of which the corresponding one of the elements of the planetary gear mechanism is coupled.

6. A vibration suppression apparatus for a hybrid vehicle as claimed in claim 1, wherein the vibration suppression control section selects the two power sources, each selected power source being superior in a torque control response from among the power sources whose torque controls are enabled to be performed, superposes the vibration suppression control signal onto each of the torque commands supplied to the selected two power sources to suppress the two-degree-of-freedom vibrations of the planetary gear mechanism.

7. A vibration suppression apparatus for a hybrid vehicle as claimed in claim 1, wherein the vibration suppression control section selects the two power sources to which coupling axles having two higher frequencies from among resonance frequencies of a torsional system coupling the respective elements of the planetary gear mechanism to the respectively corresponding power sources and superposes the vibration suppression control signal onto each of the torque commands supplied to the selected two power sources to suppress the two-degrees-of-freedom vibrations of the planetary gear mechanism.

8. A vibration suppression apparatus for a hybrid vehicle as claimed in claim 1, wherein the main power source is an engine, the plurality of auxiliary power sources are two motors, and the planetary gear mechanism to modify the gear ratio when the output of the main power source is transmitted to the drive output member is a four-element, two-degrees-of-freedom planetary gear mechanism expressed in a lever diagram in which the engine and the drive output member are interposed between the two motors and the vibration suppression control section superposes the vibration suppression signal onto each of the torque commands supplied to the two motors disposed on both ends of the lever diagram.

9. A vibration suppression apparatus for a hybrid vehicle as claimed in claim 8, wherein the main power source is an engine, the plurality of auxiliary power sources are a coaxial multi-layer motor having one stator and two rotors, and the planetary gear mechanism to modify the gear ratio when the output of the main power source of the engine is transmitted to the drive output member is a Ravigneaux compound planetary gear train expressed in the lever diagram in which the engine and drive output member are interposed between the two motors constituting the coaxial multi-layer motor.

10. A vibration suppression apparatus for a hybrid vehicle as claimed in claim 3, wherein the actual displacement calculating section calculates a translation displacement and a rotation displacement of the actual plant as follows:

$$\begin{bmatrix} \text{translation displacement} \\ \text{rotation displacement} \end{bmatrix} = \begin{bmatrix} 1 & a \\ 1 & -b \end{bmatrix}^{-1} \begin{bmatrix} x1 \\ x2 \end{bmatrix},$$

wherein x1 and x2 denote the actual translation of the selected one and other of the two elements to each of which the corresponding one of the selected respective two power sources is coupled and a and b denote torque arms between a weight center of a lever diagram of the planetary gear mechanism and that of each of the selected two elements, the model displacement calculating section calculates a translation displacement of the plant model and a rotation displacement thereof using a translation torque total for the respective elements of the plant model and a rotation torque total thereof for the elements of the plant model and translation inertia (M) and rotation inertia (J) of the planetary gear mechanism, the vibration displacement calculating section calculates the errors between the actual translation displacement of the actual plant and the model translation displacement of the model plant and between the actual rotation displacement of the actual plant and the model rotation displacement of the plant model, the disturbance torque calculating section inversely calculates their respectively corresponding translation disturbance torques using the respective errors and the inverse model of the plant model, and the correction torque calculating section synthesizes damping torques for the two elements to which the selected two power sources are coupled as follows:

$$\begin{bmatrix} \text{damping torque 1} \\ \text{damping torque 2} \end{bmatrix} = \begin{bmatrix} 1 & p \\ 1 & -q \end{bmatrix}^{-1} \begin{bmatrix} \text{translation torque} \\ \text{rotation torque} \end{bmatrix},$$

wherein damping torques 1 and 2 denote correction torques 1 and 2 to be superposed on the respective torque commands 1 and 2 to be supplied to the respective two elements to each of which the corresponding one of the selected two power sources is coupled, p and q denote torque arms of the two elements for the selected two power sources in the lever diagram of the planetary gear mechanism, and translation and rotation torques denote translation and rotation disturbance torques.

11. A vibration suppression apparatus for a hybrid vehicle as claimed in claim 10, wherein the vibration suppression control section further comprises a filtering section that filters the translation disturbance torque and the rotation disturbance torque calculated by the disturbance torque calculating section and outputs the filtered translation and rotation disturbance torques to the correction torque calculating section.

12. A vibration suppression apparatus for a hybrid vehicle as claimed in claim 10, wherein the main power source is an engine, the plurality of auxiliary power sources are first and second motors (MG1 and MG2) couples to the selected two elements (S1 and S4), and the planetary gear mechanism to modify the gear ratio when an output of the engine is transmitted to the drive output member is a four-element, two-degrees-of-freedom planetary gear mechanism expressed in a lever diagram in which the engine and the drive output member are interposed between the two motors and the vibration suppression control section superposes the vibration suppression control signal onto each of the torque commands supplied to the two motors disposed on both ends of the lever diagram.

13. A vibration suppression apparatus for a hybrid vehicle as claimed in claim 12, wherein the translation torque total is expressed as T1+T2−TL3+T4, wherein T1 denotes a torque acted upon the first element of the four-element, two-degrees-of-freedom planetary gear mechanism, T2 denotes a torque acted upon the second element thereof, TL3 denotes a load torque acted upon a third element of the drive output member thereof, T4 denotes a torque acted upon a fourth element thereof and the rotation torque total is expressed as T1Acg +T2(Acg−a2)−TL3(Acg−a3)+T4(Acg−a4), wherein Acg denotes a position of the weight center of the planetary gear mechanism from a weight center position of the first element and expressed as (a2J2+a3J3+a4J4)/M wherein J2, J3, and J4 denote rotation inertia of the second, third, and fourth elements of the four-element, two-degrees-of-freedom planetary gear mechanism and M denotes a translation inertia of four-element, two-degrees-of-freedom planetary gear mechanism, torque arms of a2, a3, and a4 from the weight center of the first element are dimensionless values determined according to the gear ratio of the four-element, two-degrees-of-freedom planetary gear mechanism.

14. A vibration suppression apparatus for a hybrid vehicle as claimed in claim 13, wherein M=J1+J2+J3+J4 and J=J1Acg2+J2(Acg −a2)2+J3(Acg−a3)2+J4(Acg−a4)2, wherein J1 denotes the rotation inertia of the first element of the four-element, two-degrees-of-freedom planetary gear mechanism.

15. A vibration suppression apparatus for a hybrid vehicle as claimed in claim 14, wherein the translation displacement of the plant model and the rotation displacement are expressed as follows;
translation displacement=double integrals of the translation torque total/M with respect to time and rotation displacement=double integrals of the rotation torque total with respect to time.

16. A vibration suppression apparatus for a hybrid vehicle as claimed in claim 15, wherein the inverse model of the plant model is expressed as Ms2 and Js2 wherein s denotes a Laplace transform operator.

17. A vibration suppression apparatus for a hybrid vehicle as claimed in claim 10, wherein the damping torque calculating section calculates the damping translation torque and the damping rotation torque, respectively, using the errors and the electrical damper having transfer functions of CMs for the error between the translation displacements of the actual plant and the plant model and of CJs for the error between the rotation displacements of the actual plant and the plant model.

18. A vibration suppression apparatus for a hybrid vehicle as claimed in claim 13, wherein M=J1+Jm1+J2+J3+J4+Jm4 and J=(J1+Jm1)Acg2+J2(Acg−a2)2+J3(Acg−a3)2+(J4+Jm4)(Acg−a4)2, wherein J1, J2, J3, and J4 denote the rotation inertias of the first, second, third, and fourth elements of the four-element, two-degrees-of-freedom planetary gear mechanism and Jm1 denote a rotation inertia of the first motor (MG1) coupled to the first element of the four-element, two degrees-of-freedom planetary gear mechanism and Jm4 denotes a rotation inertia of the second motor (MG2) coupled to the fourth element of the two-degrees-of-freedom planetary gear mechanism.

19. A vibration suppression apparatus for a hybrid vehicle, comprising:
main power source means;
auxiliary power source means;
planetary gear mechanism means for modifying a gear ratio when an output of the main power source means is transmitted to a drive output member; and
vibration suppression controlling means for selecting two power sources whose torque controls are enabled to be performed and for superposing a vibration suppression control signal onto each of torque commands supplied to the two power sources to suppress two-degrees-of-freedom vibrations of the planetary gear mechanism.

20. A vibration suppression method for a hybrid vehicle, the hybrid vehicle comprising:
a main power source;
a plurality of auxiliary power sources; and
a planetary gear mechanism to modify a gear ratio when an output of the main power source is transmitted to a drive output member and the vibration suppression method comprising:
selecting two power sources whose torque controls are enabled to be performed; and
superposing a vibration suppression control signal onto each of torque commands supplied to the selected two power sources to suppress two-degrees-of-freedom vibrations of the planetary gear mechanism.

* * * * *

UNITED STATES PATENT AND TRADEMARK OFFICE
CERTIFICATE OF CORRECTION

PATENT NO. : 7,110,867 B2  Page 1 of 1
APPLICATION NO. : 10/645910
DATED : September 19, 2006
INVENTOR(S) : Tomoya Imazu It is certified that error appears in the above-identified patent and that said Letters Patent is hereby corrected as shown below:

ON THE TITLE PAGE

The inventors should read as:

Item (75)    Inventor:    Tomoya Imazu, Kanagawa (JP); Keyvan Kargar, Versailles (FR); Yves Pichon, Boulogne-Billancourt (FR)

Signed and Sealed this

Thirteenth Day of February, 2007

JON W. DUDAS
*Director of the United States Patent and Trademark Office*

UNITED STATES PATENT AND TRADEMARK OFFICE
CERTIFICATE OF CORRECTION

PATENT NO.          : 7,110,867 B2  
APPLICATION NO.     : 10/645910  
DATED               : September 19, 2006  
INVENTOR(S)         : Tomoya Imazu, Keyvan Kargar and Yves Pichon It is certified that error appears in the above-identified patent and that said Letters Patent is hereby corrected as shown below:

ON THE TITLE PAGE OF PATENT

The inventors should read as:

Item (75)   Inventor:   Tomoya Imazu, Kanagawa (JP); Keyvan Kargar, Versailles (FR); Yves Pichon, Boulogne-Billancourt (FR)

Signed and Sealed this

Sixth Day of March, 2007

JON W. DUDAS  
*Director of the United States Patent and Trademark Office*